US010657487B2

(12) United States Patent
Mueller et al.

(10) Patent No.: US 10,657,487 B2
(45) Date of Patent: May 19, 2020

(54) CUSTOMIZING ITEM SEARCH AND NAVIGATION BASED ON USER PREFERENCES

(71) Applicant: Amazon Technologies, Inc., Seattle, WA (US)

(72) Inventors: Nathan Ross Mueller, Seattle, WA (US); Jason Andrew Brightman, Oakland, CA (US); Janelle Noh Bracken, Seattle, WA (US); Alison Louise Cramer, Seattle, WA (US); Ingibjorg Joan Elizabeth Green, Saline, MI (US); Alexis Bogie Jarr, Seattle, WA (US); Whitney Gale Spathelf, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 913 days.

(21) Appl. No.: 15/082,707

(22) Filed: Mar. 28, 2016

(65) Prior Publication Data
US 2017/0278062 A1     Sep. 28, 2017

(51) Int. Cl.
*G06Q 10/08*     (2012.01)
*G06F 16/248*     (2019.01)
(Continued)

(52) U.S. Cl.
CPC .......... *G06Q 10/0835* (2013.01); *G01S 19/13* (2013.01); *G06F 16/248* (2019.01);
(Continued)

(58) Field of Classification Search
CPC ........... G06Q 10/0835; G06Q 10/0834; G06Q 10/083; G06Q 10/08355; G06Q 30/0625;
(Continued)

(56) References Cited

U.S. PATENT DOCUMENTS 9,916,562 B1 *   3/2018  Armato ............... G06Q 10/087
10,089,674 B1 * 10/2018  Bhatia ................ G06Q 30/0627
(Continued)

FOREIGN PATENT DOCUMENTS

WO       2009085744 A1    7/2009
WO    WO-2009085744 A1 *  7/2009  ......... G06Q 30/0603

OTHER PUBLICATIONS

Anonymous, "UPS Survey Finds Shipping Critical to Online Buying Experience; Keys are Reliability, Convenience and Speed", Nov. 22, 2005, Business Wire, pp. 1-2. (Year: 2005).*
(Continued)

*Primary Examiner* — Jason B Dunham
*Assistant Examiner* — Brittany E Bargeon
(74) *Attorney, Agent, or Firm* — Thomas | Horstemeyer, LLP

(57) ABSTRACT

Disclosed are various embodiments for customizing an item search and browsing experience based on a delivery speed preference. Multiple delivery speed options are generated for a client device, and a listing of the delivery speed options are sent to the client device. A user selection of a particular delivery speed option is then received from the client device. An item search criterion is received from the client device. A listing of items selected from an electronic item database is generated based at least in part on the item search criterion and item availability via the particular delivery speed option. Data encoding the listing of items is sent to the client device for rendering on a display.

20 Claims, 11 Drawing Sheets

(51) Int. Cl.
*G06F 16/2457* (2019.01)
*G01S 19/13* (2010.01)
*G06Q 30/06* (2012.01)

(52) U.S. Cl.
CPC ... *G06F 16/24578* (2019.01); *G06Q 30/0625* (2013.01); *G06Q 30/0631* (2013.01); *G06Q 30/0641* (2013.01)

(58) Field of Classification Search
CPC .......... G06Q 30/0631; G06Q 30/0641; G06F 16/24578; G06F 16/248; G01S 19/13
USPC ...................................................... 705/26.62
See application file for complete search history.

(56) References Cited

U.S. PATENT DOCUMENTS

2010/0125494 A1* 5/2010 Boss ............... G06Q 10/08
705/14.19
2017/0270468 A1* 9/2017 Natarajan ............ G06N 5/04

OTHER PUBLICATIONS

International Search Report for PCT/US2017/022685 dated Jun. 9, 2017.

* cited by examiner

CUSTOMIZING ITEM SEARCH AND NAVIGATION BASED ON USER PREFERENCES

BACKGROUND

Networked systems for item search and navigation typically receive user-defined search criteria from a client device, and then perform a database search in order to generate a result set of items. A result set may be very large, and the client device may be unable to display the result set within a single screen or page. Thus, additional criteria may be solicited from the user after the search is performed in order to rank or filter the result set so that the user does not have to scan through many undesired results.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
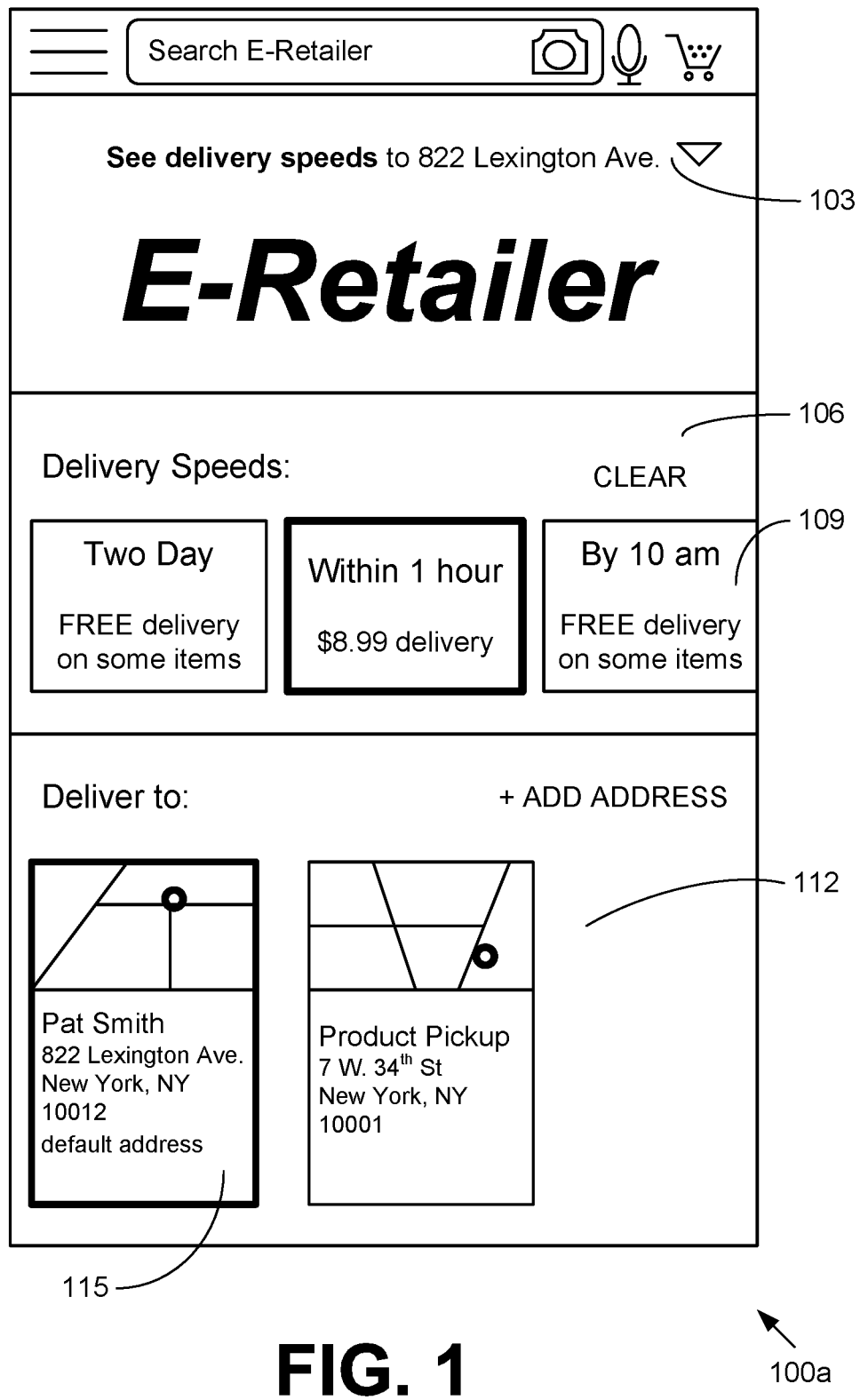
FIG. 1 is a pictorial diagram of an example user interface according to various embodiments.

The present disclosure relates to customizing an item search and browsing experience based on an expressed user preference. After a user performs an item search using a search query, a multitude of items may be returned based on relevance to the search query. The client device of the user may have a relatively small display and may not be able to show many items from the result set of items. Consequently, the user may have to review numerous pages of item search results in order to find a particular item that interests him or her. One approach to improving the user experience may involve allowing the user to define additional criteria for sorting or filtering the search results after the results are presented. However, these additional criteria do not persist after the search and are not used to customize subsequent navigation within a network site.

Various embodiments of the present disclosure facilitate a user specification of a preference that persists during the browsing session. Thus, when additional searches are performed, the results are automatically customized for the persistent preference. Moreover, additional pages in a network site, such as a home page, a category page, an item detail page, and so on, are customized according to the user preference. Also, alternative paths for item navigation and search may be provided within a relatively small display to ease item discovery. For instance, pages may include alternative paths for item navigation and discovery if the user's preference cannot be met through a primary path.

One type of preference may involve delivery speed. A variety of delivery options may be provided for items. Some items may be available instantly, such as digital video features or mobile applications, while other goods may need to be physically shipped to the user. For items that are to be physically shipped, items may be stored in warehouses that are within the same metropolitan area as the user, while other items may be stored in warehouses that are several states away. Thus, some items may be more quickly available due to a shorter geographic distance from source to destination, while other items may be less quickly available due to a greater geographic distance. Moreover, a shipping carrier may offer multiple delivery services, including bike courier services, ground delivery services, air freight, sea freight, and so on. As used herein, delivery to a user may encompass the user picking up an item at an inventory storage location serving as a pick-up point.

Various embodiments of the present disclosure provide for a dynamically generated set of delivery speed options that are selectable for users to customize their search and browsing experiences. The availability of a particular delivery speed may depend upon the time that an order is placed, the delivery address of the user, a subscription status of the user, the location of item inventory, and/or the availability of a delivery service, among other factors. For example, same-day delivery may be available for a given delivery location until a certain cut-off time, so depending upon the user's proposed delivery location and the current time, same-day delivery may or may not be offered as a delivery speed option.

Further, in order to improve the user's experience, the user may specify a delivery speed preference before searching or browsing for items. This delivery speed preference may persist throughout the user's browsing session so that the search results returned to the user are based on the preference, and so that the user does not have to manually select delivery speed options to refine search results after each set of search results is generated. However, if circumstances warrant, the user may be prompted to confirm the current delivery speed preference or to select another delivery speed preference. In some cases, a preferred delivery speed may be inferred, for example, in response to a user adding an item to a cart with a specific delivery speed, delivery speeds specified for past orders, or other implicit indications of delivery speed preference.

In some embodiments, where a particular item or a best match to a search query is unavailable at a preferred delivery speed, the particular item or best match may be presented to the user along with an indication that it is unavailable and alternatives that are available at the preferred delivery speed. Also, where multiple delivery locations are possible, an alternative delivery location may be recommended to the user in order to satisfy the user's specified delivery speed preference.

With reference to FIG. 1, shown is one example of a user interface 100a according to various embodiments. The user interface 100a illustrates an approach to establishing a delivery speed preference prior to searching or browsing for items offered by an item search and navigation application. In this example, a user may select a component 103 in the user interface 100a in order to begin establishing a delivery speed preference. Upon selection of the component 103, a delivery speed selection tool 106 may be rendered in the user interface 100a. The delivery speed selection tool 106 may include a dynamically generated listing of a plurality of delivery speed options that are available for a particular address given the current time of day. The delivery speed options may pertain to fixed speeds (e.g. within an hour) and/or fixed windows for delivery (e.g., by 10 am). In this case, the component 103 indicates that the address is "822 Lexington Ave."

In the delivery speed selection tool 106, each delivery speed option is presented using a respective selectable delivery speed component 109. Here, three selectable delivery speed components 109 are illustrated, corresponding to a "two day" delivery speed, a "within one hour" delivery speed, and a "by 10 am" delivery speed. The selectable delivery speed components 109 are dynamically generated according to the current time of day, so that when a user returns to the user interface 100a at 1 pm, the "by 10 am" option is no longer shown. The delivery speed selection tool 106 may include a scrollable viewport such that additional selectable delivery speed components 109 may be shown by scrolling or swiping to the right or left. Once the user selects a particular selectable delivery speed component 109, the user selection may persist throughout the browsing session with the item search and navigation application or until an expiration event. The user selection is employed to customize search and browsing to emphasize items that are available with the preferred delivery speed of the user.

A delivery address selection tool 112 may be provided in the user interface 100a in order to facilitate a user selection of a particular delivery address. The account of the user may be associated with a set of prior addresses that have been used for previous deliveries. These prior addresses may be used to populate the delivery address selection tool 112 with selectable address components 115. The selectable address components 115 may, for example, each illustrate a map view of the respective address in addition to showing an associated name and the address. One address may be selected by default. Scrolling or swiping actions may be used to reveal other addresses that are associated with the account.

In addition to prior addresses, additional addresses may be featured as potential delivery addresses if, for example, the user is predicted to travel near the potential delivery address. For example, a certain store on the user's route from work to home may be a designated pickup location for one delivery method. Users may also enter additional addresses. If a user selects a different address via the delivery address selection tool 112, the available delivery speed options may change, and the user may have to select a different delivery speed if the previously selected delivery speed becomes unavailable (e.g., a courier service that delivers within an hour to a previously selected address may not deliver to the newly selected address). In the following discussion, a general description of the system and its components is provided, followed by a discussion of the operation of the same.

Figure 2:
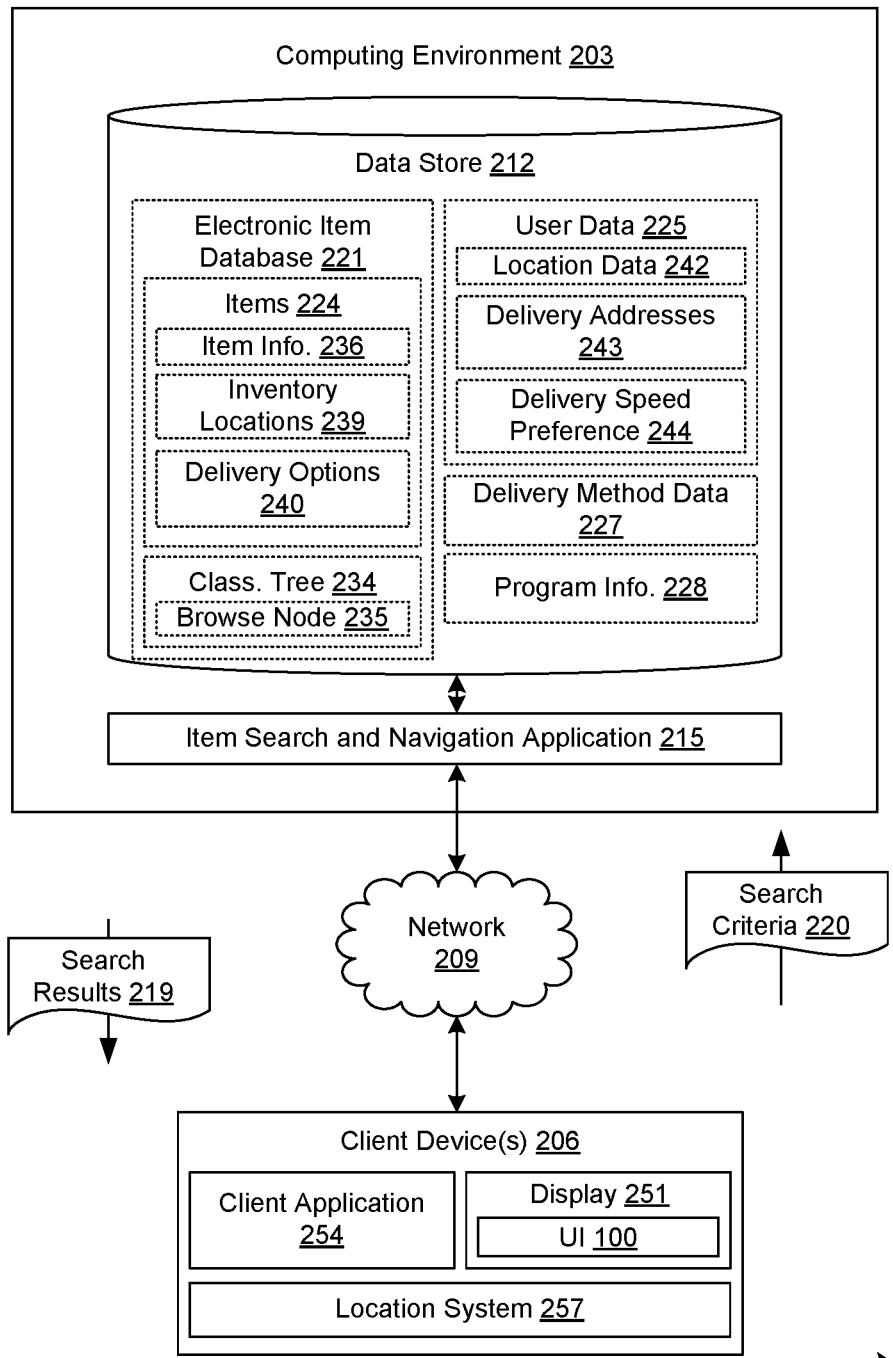
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an item search and navigation application 215 and other applications, services, processes, systems, engines, or functionality not discussed in detail herein. The item search and navigation application 215 is executed in order to facilitate the online selection of items over the network 209. The item search and navigation application 215 may perform various backend functions associated with an electronic marketplace in order to facilitate the online selection of items as will be described. For example, the item search and navigation application 215 may generate network pages such as web pages or other types of network content that are provided to client devices 206 for the purposes of selecting items for purchase, rental, download, lease, or other form of consumption as will be described.

The item search and navigation application 215 may also generate search results 219 in response to receiving search criteria 220 from a client device 206 over the network 209. To this end, the item search and navigation application 215 is configured to search an electronic item database 221 for items 224 that are associated with data that matches the search criteria 220. The item search and navigation application 215 may apply one or more refinements received from the client device 206 or stored in connection with a user profile in order to filter or limit the search results 219. The generated search results 219 may be included within a search result listing that is returned to the client device 206 for rendering in a user interface.

The data stored in the data store 212 includes, for example, an electronic item database 221, user data 225, delivery method data 227, program information 228, and potentially other data. The electronic item database 221 includes information about a plurality of items 224 offered by one or more sellers in an electronic marketplace facilitated by the item search and navigation application 215. As used herein, the term "item" may refer to products, goods, services, downloads, and/or any other item that may be offered for sale, lease, rental, or other forms of consumption.

In some cases, the items 224 may be organized within the electronic item database 221 into a classification tree 234 (or taxonomy) of categories to facilitate browsing, which may be represented, for example, by a tree structure composed of browse nodes 235. As a non-limiting example, a browse node 235 may correspond to "Crafts" with multiple child browse nodes 235 such as "Jewelry" and "Home Decor." An item 224 may be associated with one or more such browse nodes 235.

Each item 224 may be associated with item information 236, inventory locations 239, delivery options 240, and/or other data. In some cases, an item 224 may be offered by multiple sellers in an electronic marketplace. The item information 236 may include title, description, weight, images, shipping classifications, user reviews, videos, and/or other information that may be used to describe an item 224. The inventory locations 239 may specify locations of materials handling facilities (e.g., fulfillment centers, warehouses, etc.) where inventory of the items 224 are currently stored. In some cases, the inventory locations 239 may correspond to vehicles upon which the inventory of the items 224 is currently stored during transit between facilities or prior to delivery. A given item 224 may be associated with one or more delivery options 240. For example, an item 224 may be available for delivery via parcel post, next-day air, bicycle courier, etc. By contrast, a perishable item 224 may not be available for delivery via a slower delivery method such as parcel post, while a heavy or bulky item 224 may not be available for delivery via bicycle courier.

The user data 225 may include various data about users of the electronic marketplace, including profile information, personalization information, demographic information, browsing history, order history, previous purchasing habits, and so on. In particular, the user data 225 may include location data 242, one or more delivery addresses 243, a delivery speed preference 244, and/or other data. The location data 242 may correspond to locations of the client device 206 reported from a global positioning system (GPS) device or other location system of the client device 206 or determined through a geolocation approach based upon a network address. The location data 242 may include locations of the user tracked over time in order to determine a direction, and possibly a route, of the user in order to recommend potential pick-up locations along the route of the user.

The delivery addresses 243 correspond to a set of addresses to which the user has previously had shipments delivered. In some cases, the delivery addresses 243 may include addresses that the user has specified but not actually used for delivery. One of the delivery addresses 243 may be designated as a default address, and the default address may change over time or based at least in part on the location of the user as evidenced by the location of the client device 206.

The delivery speed preference 244 corresponds to a preferred delivery speed that has been specified by the user. The delivery speed preference 244 is employed to filter or organize search results 219 and to customize a browsing experience (e.g., offers presented in a buy box or detail page) so that offers of items 224 at the preferred delivery speed are highlighted or emphasized to the user. The delivery speed preference 244 may remain valid during the lifetime of a user's browsing session or until an expiration event occurs. Examples of expiration events may include passage of a particular interval of time (e.g., twelve hours), closure of a browsing window or application, consummation of an order, adding an item unavailable via the preferred delivery speed to a shopping cart, and so on.

The delivery method data 227 includes data regarding a plurality of delivery methods that are available to deliver items to users. These delivery methods can include bicycle couriers, pedestrian couriers, third-party shipping services including private carriers and common carriers, UNITED STATES POSTAL SERVICE®, UNITED PARCEL SERVICE®, and/or other delivery methods. The delivery methods may be associated with differing service levels, and a particular carrier may offer multiple service levels (e.g., next-day air premium, next-day air saver). The delivery method data 227 may provide rules that indicate which geographic areas and delivery addresses 243 are served via a delivery method and what types of items 224 can be delivered via the delivery method.

These service levels may provide differing delivery speeds. The delivery speed offered via a particular delivery method may depend upon the current time of day and a required order submission time. For example, a delivery method offering next-day air shipment may require that an order be submitted by 2 pm in order for the order fulfillment to occur and for the parcel to be tendered to the shipping carrier in time to be shipped. The delivery speed offered may also depend upon the delivery location. For example, a bicycle courier may be at a particular starting location, which may offer thirty minute delivery to one delivery address or an hour delivery to another delivery address. It is noted that promised delivery speeds can correspond to a promised maximum time for delivery or a promise for a delivery at a specific time. In some cases, users may prefer a later delivery within a specific time window in order to ensure that they are at the delivery location to receive the delivery.

The program information 228 may include parameters and criteria applicable to various delivery programs. For example, some delivery programs and associated delivery methods may be available only to users having a certain status, such as a subscription status. Some programs may be made available based upon spending thresholds, quantity thresholds, loyalty thresholds, and/or other factors.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 251. The display 251 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 254 and/or other applications. The client application 254 may be executed in a client device 206, for example, to access network content served up by the computing environment 203 and/or other servers, thereby rendering a user interface 100 on the display 251. To this end, the client application 254 may comprise, for example, a browser, a dedicated application, etc., and the user interface 100 may comprise a network page, an application screen, etc.

The client device 206 may be configured to execute applications beyond the client application 254 such as, for example, email applications, social networking applications, word processors, spreadsheets, and/or other applications. The client device 206 may also include a location system 257 configured to report a physical location of the client device 206. The location system 257 may include a global positioning system (GPS) device, a cellular radio triangulation system, a WiFi access point reporting system, or other hardware.

Figure 3A:
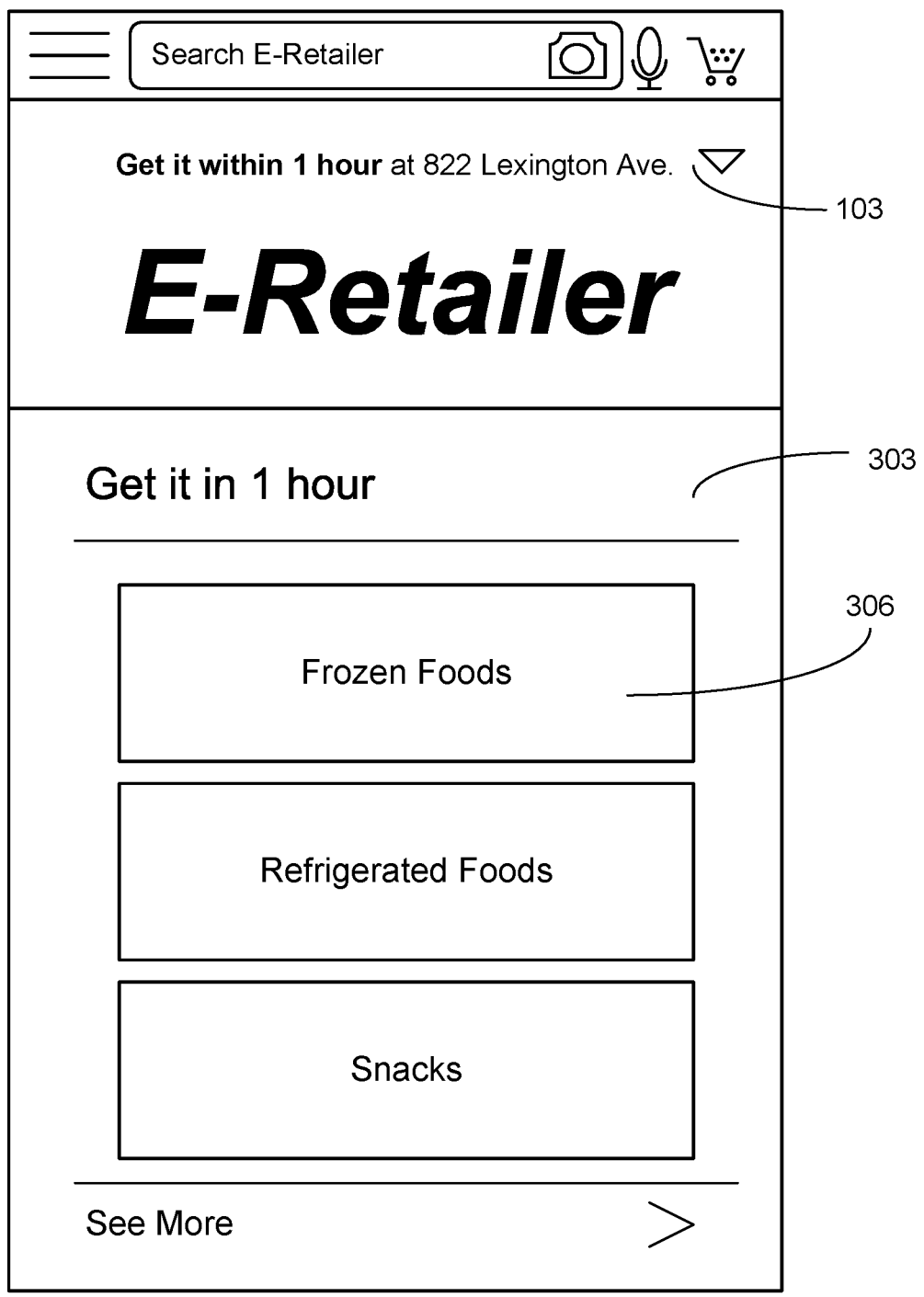
FIGS. 3A-3F are pictorial diagrams of example user interfaces rendered by a client device in the networked environment of FIG. 2 according to various embodiments of the present disclosure.

Referring next to FIG. 3A, shown is one example of a user interface 100b rendered on a display 251 (FIG. 2) of a client device 206 (FIG. 2) in the networked environment 200 (FIG. 2) according to various embodiments. In this example, a user has established a delivery address and a delivery speed preference of "one hour" through a previous user interface, such as the user interface 100a (FIG. 1). The component 103 (FIG. 1) is updated to inform the user that the browsing and search experience of the item search and navigation application 215 (FIG. 2) is customized for the selected delivery speed option.

The user interface 100b may correspond to a home page or category page of the item search and navigation application 215. The content 303 is customized to surface or emphasize categories of items 224 (FIG. 2) in which the items 224 are available within the preferred delivery speed. When a particular category component 306 is selected, the user interface 100b is updated to show items 224 in that respective category that are available within the preferred delivery speed. The user interface 100b can be customized in this way after the user indicates a delivery speed preference but before the user expresses any interest in particular items 224, item categories, or search criteria.

Figure 3B:
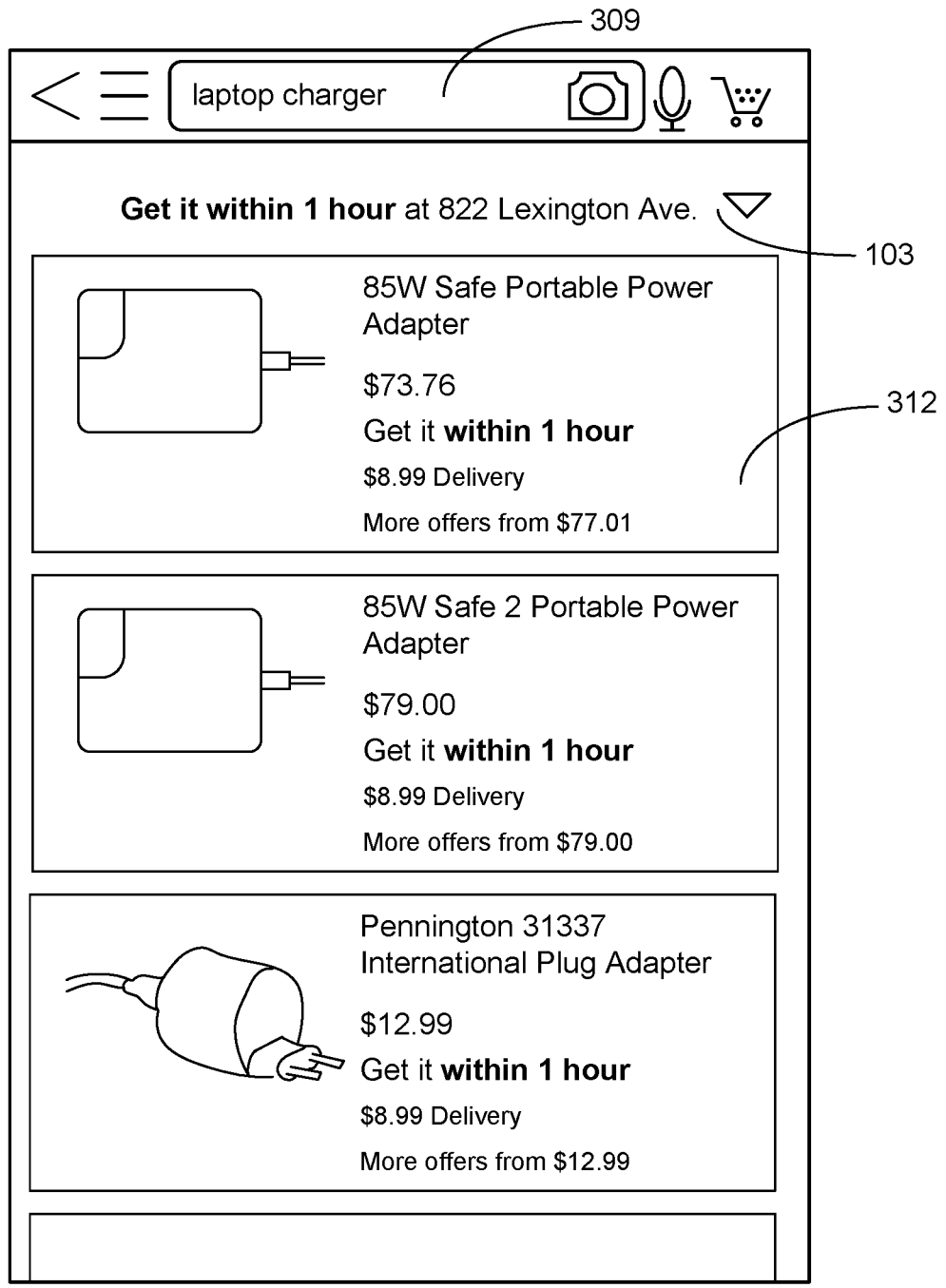

Turning now to FIG. 3B, shown is one example of a user interface 100c rendered on a display 251 (FIG. 2) of a client device 206 (FIG. 2) in the networked environment 200 (FIG. 2) according to various embodiments. In the user interface 100c, a user has executed a search query of "laptop charger" via the search component 309 to discover relevant results 312. Previously, the user has established a delivery speed preference of "within one hour" via the user interfaces 100a (FIG. 1), 100b (FIG. 3A) or another user interface. Accordingly, the items 224 (FIG. 2) and results 312 that are presented are customized for this delivery speed preference. Each of the results 312 that are shown are available for delivery within one hour to the specified address of "822 Lexington Ave." The results 312 that are shown or their relative ranking may also be customized based at least in part on other personalization factors, such as a subscription status of the user and purchase history.

Although each of the results 312 that are shown in this example user interface 100c are available via the preferred delivery speed, it is understood that the user interface 100c may include search results 219 (FIG. 2) that are not available via the preferred delivery speed. However, the search results 219 that are not available via the preferred delivery speed may be ranked lower, shown "below the fold," shown with results 312 consuming a smaller display area, or otherwise deemphasized. In such cases, the text accompanying the search results 219 may be modified. For example, rather than stating the preferred delivery speed, the text may include an indication of the delivery speed through which the corresponding item 224 is available.

Figure 3C:
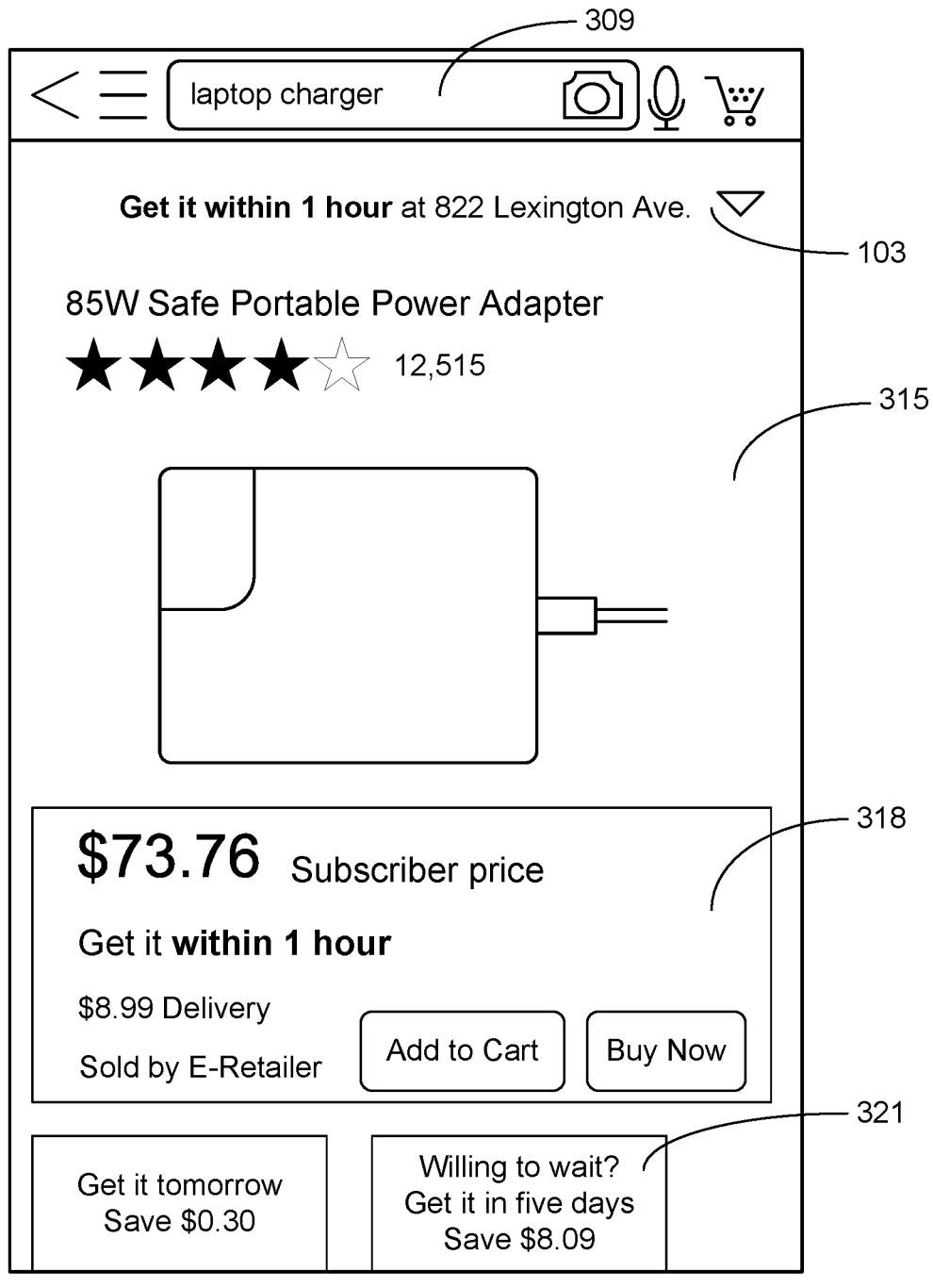

Moving on to FIG. 3C, shown is one example of a user interface 100d rendered on a display 251 (FIG. 2) of a client device 206 (FIG. 2) in the networked environment 200 (FIG. 2) according to various embodiments. The user interface 100d shows a detail page 315 for a particular item 224 (FIG. 2) selected via the previous user interface 100c (FIG. 3B). The detail page 315 may provide additional information about the item 224 that is not shown in a search results page. Although a user may arrive at the detail page from a listing of search results 219 (FIG. 2), a user may also arrive at the detail page from a direct link, from the home page, from a category, or from another referrer.

The detail page 315 is customized for the previously specified delivery speed preference. Although other offers to sell the item 224 are available at lower prices, because the user has expressed a preference for the delivery speed of "within one hour," the detail page emphasizes a primary result 318 having this delivery speed. In emphasizing this result 318, it may be shown first in the user interface 100d, have larger text, occupy a larger space on the display 251, or have other distinguishing characteristics. The result 318 also includes components that allow the user to add the item 224 to a shopping cart with the parameters of the result 318 or to initiate placing an order for the item 224 with the parameters of the result 318. In this case, the detail page 315 also includes multiple secondary results 321, which offer delivery speeds that do not match the expressed user preference. However, these delivery speeds may be associated with lower costs, so a user may wish to select these secondary results 321 in order to reduce delivery cost. That is to say, because the detail page 315 includes more information than the user interface 100c (FIG. 3B) as a matter of course, the user may determine based on a review of the detail page 315 that he or she would like to consider other options. Upon this review, a user may elect to switch to an alternative delivery speed, e.g., to obtain savings in the cost of the item 224.

Figure 3D:
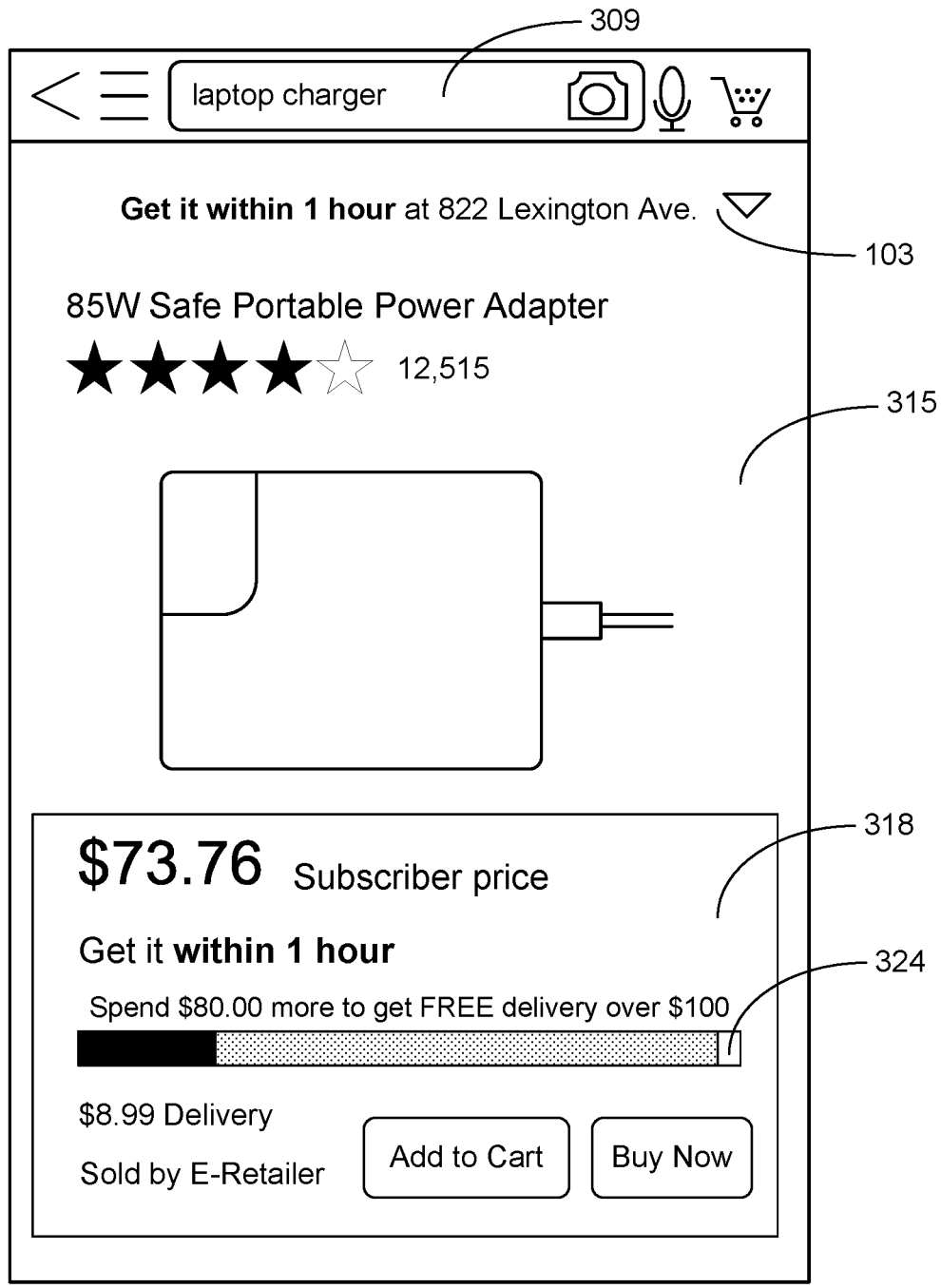

Continuing to FIG. 3D, shown is one example of a user interface 100e rendered on a display 251 (FIG. 2) of a client device 206 (FIG. 2) in the networked environment 200 (FIG. 2) according to various embodiments. The user interface 100e shows the detail page 315 (FIG. 3C) and the primary result 318 (FIG. 3C) of the user interface 100d (FIG. 3C) with the addition of a threshold indicator 324. The threshold indicator 324 shows that the user is eligible for a delivery promotion (e.g., free expedited shipping) by spending a certain additional amount.

In this case, the threshold indicator 324 shows that the user has already added items 224 costing $20 to a shopping cart, but $80 remains until the required threshold ($100) is met. The threshold indicator 324 visually indicates how much is already added to the shopping cart in addition to the impact if this item 224 (FIG. 2) were added to the shopping cart. Different colors, patterns, or shading may be used to visually indicate the previous contribution of the shopping cart and the tentative contribution of the primary result 318 to the threshold. Threshold indicators 324 may also be included in search result pages, home pages, category pages, and/or other pages. If the user selects a "Buy Now" component without the threshold being met, the user interface 100e may inform the user that the threshold has not been met and request confirmation that the user wishes to proceed with a higher cost option or an alternative delivery speed.

Figure 3E:
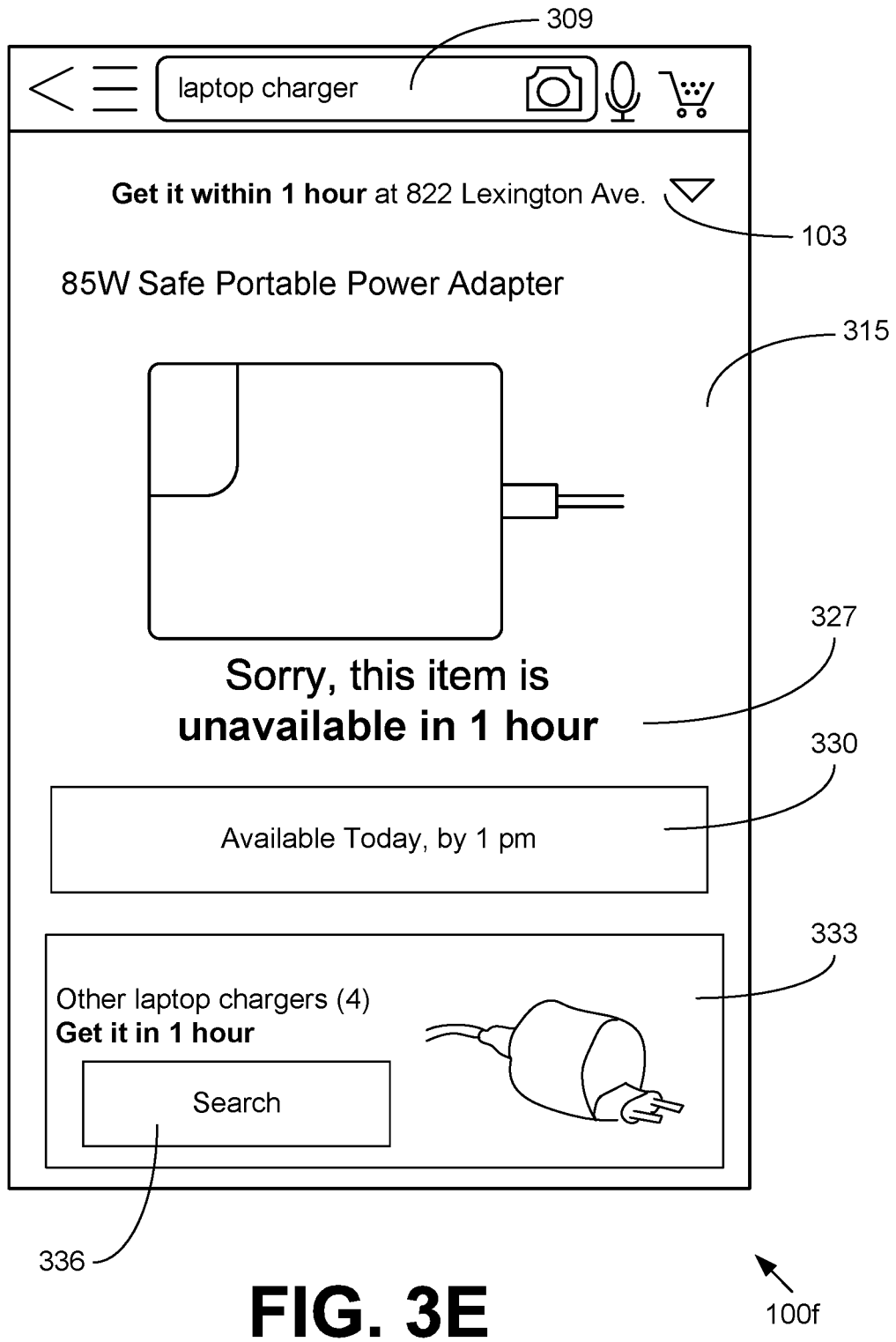

Moving on to FIG. 3E, shown is one example of a user interface 100f rendered on a display 251 (FIG. 2) of a client device 206 (FIG. 2) in the networked environment 200 (FIG. 2) according to various embodiments. The user interface 100f corresponds to the detail page 315 for the item 224 shown in FIG. 3C. However, the item 224 is not available at the preferred delivery speed of one hour. A message 327 informs the user that the item 224 is not available at the preferred delivery speed. For example, in the time that has elapsed since the user executed an item search, remaining inventory of the item 224 at a nearby location may have already sold, or a delivery cut-off time may have been missed.

The detail page 315 includes a component 330 that informs the user that the desired item 224 is still available for ordering at an alternative delivery speed (in this case, for delivery "by 1 pm"). Upon selection of the component 330, additional information about the corresponding offer (e.g., price, shipping fees) may be rendered in the user interface 100f. The user interface 100f may also include components for adding the item 224 to a shopping cart or initiating an order of the item 224 with the alternative delivery speed.

The detail page 315 also includes a region 333 that describes similar items 224 that are available for order at the preferred delivery speed. The alternative items 224 may be identified as similar to the primary item 224 that is featured in the detail page 315 based upon a classification tree 234 (FIG. 2) by locating the parent browse node 235 (FIG. 2) with which the primary item 224 is associated. The user may select the search component 336 to cause information about the alternative items 224 to be presented. By providing the region 333 to facilitate navigating to alternative items 224 as a matter of course, a user who needs an item 224 within a specific timeframe is able to easily choose other similar items 224 that may be suitable. This is easier and more convenient than the user having to execute another search to try to find alternative items 223 that are deliverable within the required time frame.

In another embodiment, the user interface 100f may present an alternative delivery address at which delivery of the desired item 224 is available at the preferred delivery speed. The alternative delivery address may correspond to any of the delivery addresses 243 (FIG. 2) associated with the user. In some cases, the delivery address may be automatically selected based on the location data 242 (FIG. 2) reported by the client device 206. For example, if the user is driving from home to work, a pick-up location that is generally along the route may be suggested.

Figure 3F:
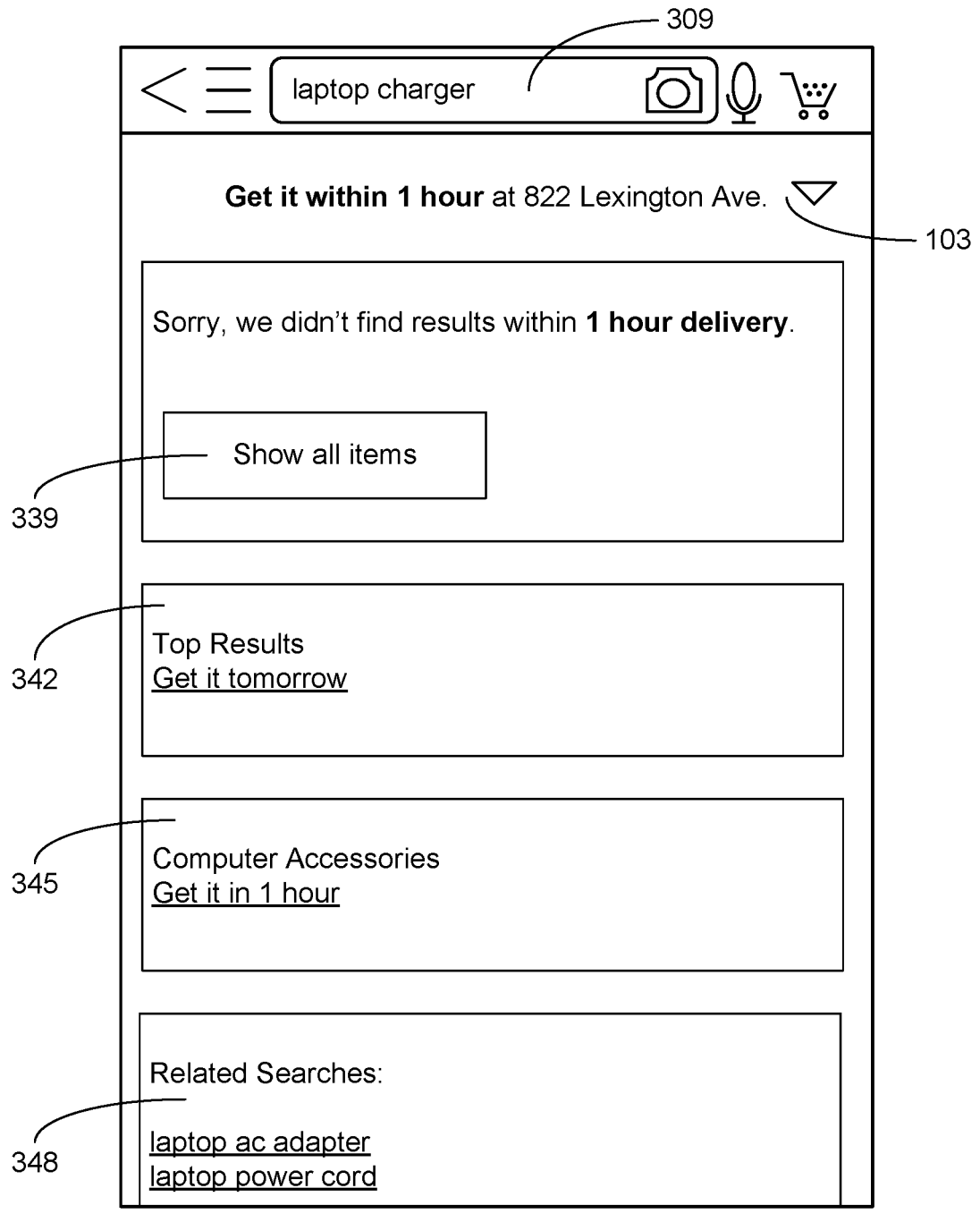

With reference to FIG. 3F, shown is one example of a user interface 100g rendered on a display 251 (FIG. 2) of a client device 206 (FIG. 2) in the networked environment 200 (FIG. 2) according to various embodiments. The user interface 100f corresponds to a search result page offering alternatives similar to that of FIG. 3E. In this example, as in FIG. 3B, a user has executed a search query of "laptop charger" via the search component 309. However, here, there are no matching results available for the selected delivery speed of one hour. A component 339 is provided for the user to remove the delivery speed preference so as to show all matching items 224 (FIG. 2).

Another component 342 may allow the user to expand the search to see relevant items 224 available at another delivery speed, such as delivery by tomorrow. Component 345 may allow the user to broaden out the search for items 224 that are in a similar item category, e.g., by determining a browse node 235 (FIG. 2) that corresponds to the search query in the classification tree 234 (FIG. 2). The components 348 may facilitate the selection of related search terms that may allow the user to discover other items 224 that may be available at the preferred delivery option.

Figure 4:
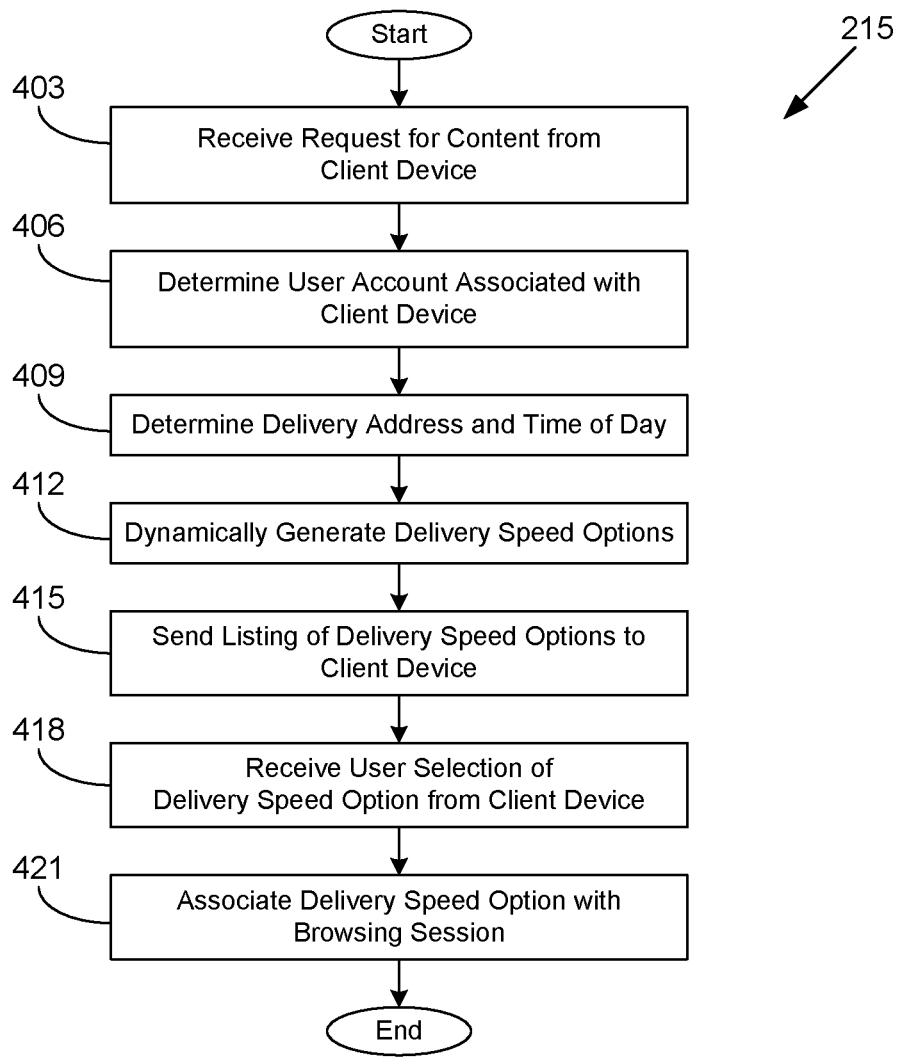
FIGS. 4 and 5 are flowcharts illustrating examples of functionality implemented as portions of an item search and navigation application executed in a computing environment in the networked environment of FIG. 2 according to various embodiments of the present disclosure.

Referring next to FIG. 4, shown is a flowchart that provides one example of the operation of a portion of the item search and navigation application 215 according to various embodiments. It is understood that the flowchart of FIG. 4 provides merely an example of the many different types of functional arrangements that may be employed to implement the operation of the portion of the item search and navigation application 215 as described herein. As an alternative, the flowchart of FIG. 4 may be viewed as depicting an example of elements of a method implemented in the computing environment 203 (FIG. 2) according to one or more embodiments.

Beginning with box 403, the item search and navigation application 215 receives a request for content from a client device 206 (FIG. 2) via the network 209 (FIG. 2). For example, the client device 206 may request a home page, a detail page, a category page, or another type of content. The request may include a cookie or form data that uniquely identifies the user account associated with the client device 206. In box 406, the item search and navigation application 215 examines the cookie data and/or the form data to identify the particular user account associated with the client device 206.

In box 409, the item search and navigation application 215 determines a delivery address associated with the user account, the current time of day, and potentially other factors that may bear upon delivery speed availability. For example, a user account may be associated with a default delivery address to which orders are shipped most frequently. Alternatively, the item search and navigation application 215 may ascertain a current location of the client device 206 as reported by the location system 257 (FIG. 2) of the client device 206, and then identify a closest delivery address from the associated delivery addresses 243. In another example, the user may manually specify a preferred delivery address. In one embodiment, the current weather may be a factor, as the delivery method data 227 (FIG. 2) may indicate that some delivery methods are unavailable in inclement weather.

In box 412, the item search and navigation application 215 dynamically generates a plurality of delivery speed options. In doing so, the item search and navigation application 215 may examine the delivery method data 227 (FIG. 2) to determine which delivery methods are available given the proposed delivery location, the current time of day, and other factors. For example, more delivery methods may be available early in the morning rather than late in the afternoon, as there may be a cut-off time by which a shipment must be tendered. Thus, the item search and navigation application 215 may compare a current time with a required order submission time associated with a possible delivery speed option. Some delivery methods may be available only for users having a certain subscription status or who participate in a certain program. Also, some delivery methods will be available only in urban areas (e.g., bicycle couriers), so delivery locations in rural areas will not be compatible. In addition, delivery carriers may have limited capacity or may be limited in service area at a given time due to deliveries that have already been scheduled. The item search and navigation application 215 may be configured to obtain updated delivery method data 227 from external or internal data providers on-demand or on a periodic basis.

In one embodiment, multiple delivery methods may be aggregated into a single delivery speed option according to predefined rules. For example, a bicycle courier may offer delivery within 30 minutes, while a local delivery truck may offer delivery within an hour. Both delivery methods may be encompassed within one dynamically generated delivery speed option, where the delivery speed option is generated according to a maximum time for any of a plurality of delivery methods to deliver to a particular delivery location. In this case, a predefined rule may specify that "within one hour" is to be an option, while "within 30 minutes" is not. If the user chooses that specific delivery speed option (e.g., "within one hour"), the item search and navigation application 215 may choose to fulfill the order with the lowest cost to meet the delivery speed promise. Alternatively, one or more of the delivery methods aggregated into a single delivery speed option may become unavailable, leaving the item search and navigation application 215 to choose another remaining delivery method automatically.

In dynamically generating the delivery speed options, the item search and navigation application 215 may render text describing the delivery speed options in various ways. For example, the text may be rendered as a time range promise (e.g., within an hour). Alternatively, the text may be rendered as a specific time promise (e.g., by 2 pm).

In box 415, the item search and navigation application 215 sends a listing of the delivery speed options to the client device 206 via the network 209. The client application 254 (FIG. 2) executed by the client device 206 is then configured to render a user interface 100 (FIG. 1) that enables a user to select from the delivery speed options. Alternatively, a user may specify a different address, and the delivery speed options may be dynamically generated again. In box 418, the item search and navigation application 215 receives a user selection of a particular delivery speed option from the client device 206 via the network 209.

In box 421, the item search and navigation application 215 associates the particular delivery speed option with the current browsing session. The particular delivery speed option may then remain associated with the browsing session until the user chooses another delivery speed option, or until an expiration event occurs. Expiration events can include, for example, the passage of a certain interval of time (e.g., one hour), adding an item 224 (FIG. 2) that is not compatible with the particular delivery speed option to a shopping cart, placing an order, passing a required order submission time for the particular delivery speed option, and/or other events.

While associated with the browsing session, content served by the item search and navigation application 215 will be customized for the preference for the delivery speed option that has been expressed by the user. This can include search results, home pages, detail pages, category pages, buy boxes, and/or other content served by the item search and navigation application 215. In some embodiments, the particular delivery speed option can be associated with the user data 225 (FIG. 2) such that it is shared by affiliate item search and navigation applications 215 that have access to the user data 225. Thereafter, the portion of the item search and navigation application 215 ends.

Figure 5:
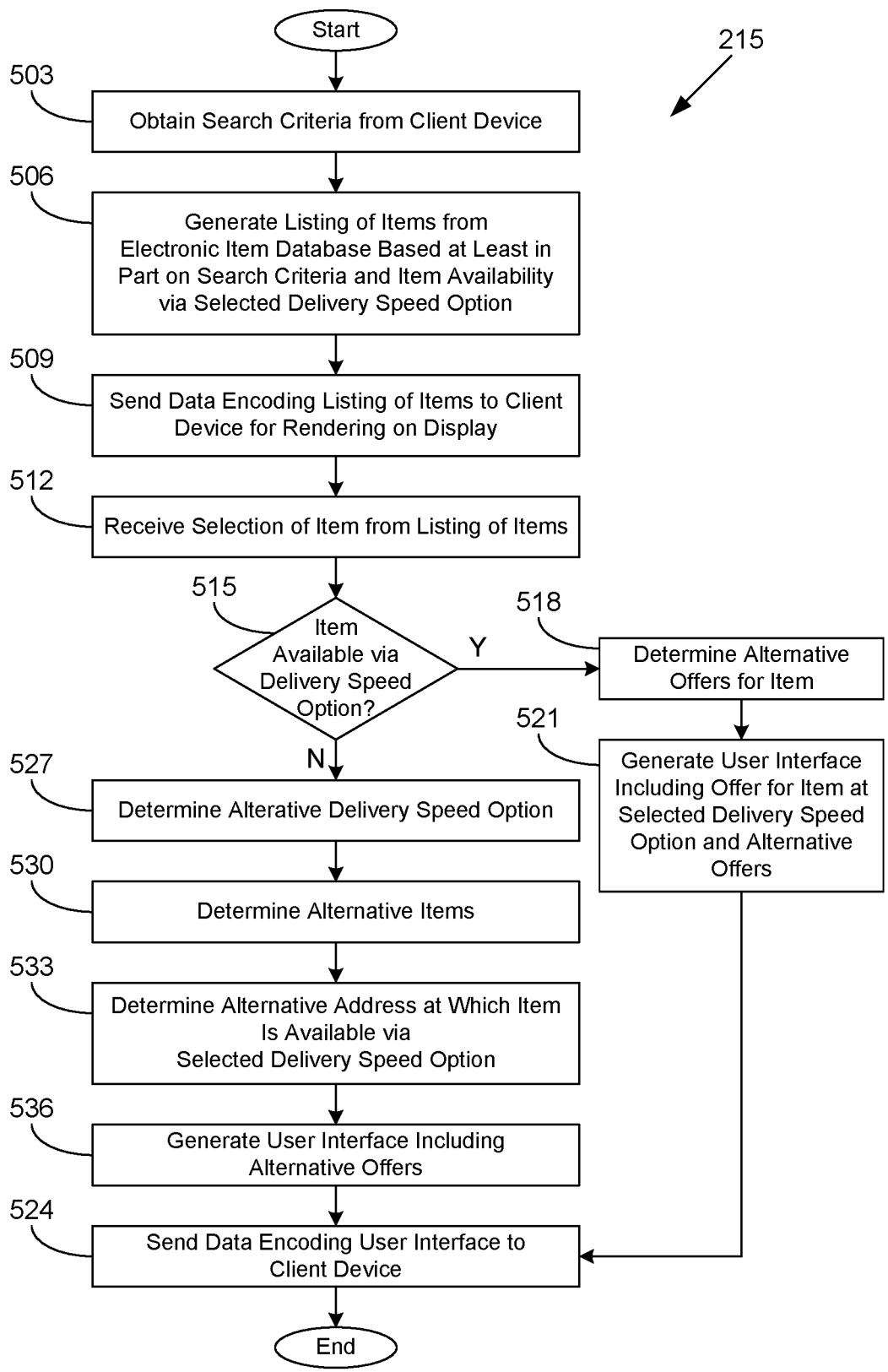

Referring next to FIG. 5, shown is a flowchart that provides one example of the operation of another portion of the item search and navigation application 215 according to various embodiments. It is understood that the flowchart of FIG. 5 provides merely an example of the many different types of functional arrangements that may be employed to implement the operation of the portion of the item search and navigation application 215 as described herein. As an alternative, the flowchart of FIG. 5 may be viewed as depicting an example of elements of a method implemented in the computing environment 203 (FIG. 2) according to one or more embodiments.

Beginning with box 503, the item search and navigation application 215 obtains search criteria 220 (FIG. 2) such as an item query or a search query from a client device 206 (FIG. 2) via the network 209 (FIG. 2). In an item query, a client device 206 may submit a request for a content page on which a listing of items 224 (FIG. 2) is to be included. In box 506, the item search and navigation application 215 generates a listing of items 224 from the electronic item database 221 (FIG. 2) based at least in part on relevance of the items 224 to the search criteria and availability of the items 224 via a selected delivery speed option obtained from a user associated with the client device 206 before the search criteria were received.

In box 509, the item search and navigation application 215 sends data encoding the listing of items 224 to the client device 206 for rendering on a display 251 (FIG. 2) of the client device 206. In box 512, the item search and navigation application 215 receives a selection of an item 224 from the listing of items 224.

In box 515, the item search and navigation application 215 determines whether the item 224 is still available for delivery via the selected delivery speed option preferred by the user to a particular delivery address. If the item 224 is still available via the selected delivery speed option, the item search and navigation application 215 may continue to box 518 and determine one or more alternative offers for the item 224 with other delivery speed options. For example, the item 224 may be available with a marginally slower delivery speed option for a discount.

In box 521, the item search and navigation application 215 generates a user interface 100d (FIG. 3C) including an offer for the item 224 at the selected delivery speed option. The user interface 100d may also include one or more alternative offers for the item 224 as well as other content. In box 524, the item search and navigation application 215 sends data encoding the user interface 100d to the client device 206 via the network 209. Thereafter, the portion of the item search and navigation application 215 ends.

If, instead, the item search and navigation application 215 determines in box 515 that the item 224 is no longer available via the selected delivery speed option to the delivery address, the item search and navigation application 215 proceeds from box 515 to box 527. In box 527, the item search and navigation application 215 determines an alternative delivery speed option for the item 224 to the delivery address if one is available. For example, if the user has missed a required order submission deadline for delivery by 1 pm, an alternative delivery speed option of delivery by 5 pm may be available for the same item 224 to the same delivery address.

In box 530, the item search and navigation application 215 determines one or more alternative items 224 that are similar to the item 224 and are available for delivery to the delivery address using the selected delivery speed option. As an example, the alternative items 224 may be items 224 that are the next most relevant to the search criteria 220 in a listing of search results 219. As another example, the alternative items 224 may be items 224 that are associated with a parent browse node 235 of the particular item 224 in an item classification tree 234 (FIG. 2).

In box 533, the item search and navigation application 215 determines an alternative delivery address at which the particular item 224 is available via the selected delivery speed option. For example, the particular item 224 may be available for delivery via the selected delivery speed option at another delivery address already associated with the user via the delivery addresses 243. Alternatively, the particular item 224 may be available for delivery via the selected delivery speed option at a location within a predefined distance of the user's current location as reported by the location system 257. As another alternative, the user's direction of travel may be determined, and a pick-up location along the user's estimated route or within a predefined distance may be used.

In box 536, the item search and navigation application 215 generates a user interface 100 including alternative offers. In various embodiments, one or more of the types of alternatives (i.e., alternative delivery speed option, alternative item 224, alternative delivery address) may be offered to the user for selection. In box 524, the item search and navigation application 215 sends data encoding the user interface 100 to the client device 206 via the network 209. Thereafter, the portion of the item search and navigation application 215 ends.

Figure 6:
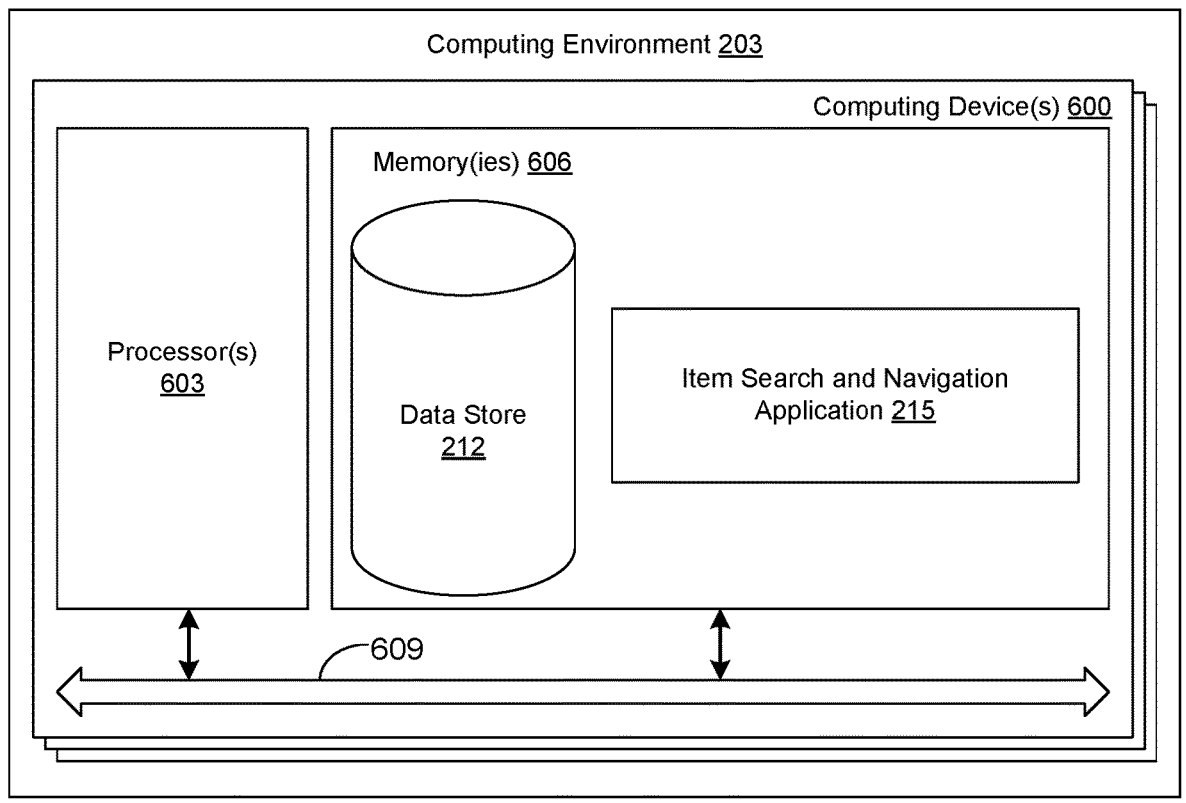
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the item search and navigation application 215 and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the item search and navigation application 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the item search and navigation application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item search and navigation application 215, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the item search and navigation application 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program includes instructions that cause the at least one computing device to at least:
   determine a location reported by a location system of a client device, the location system comprising at least one of: a global positioning system (GPS) device, a cellular radio triangulation system, or a WiFi access point reporting system;
   determine a current address from a plurality of addresses associated with a user account based at least in part on the location reported by the location system;
   dynamically generate a plurality of delivery speed options for the client device for items in a data set based at least in part on a current time of day and the current address;
   send a listing of the plurality of delivery speed options to the client device for rendering on a display;
   receive a user selection of a particular delivery speed option of the plurality of delivery speed options from the client device;
   receive an item query from the client device;
   determine item availability via the particular delivery speed option for items in an electronic item database;
   generate a listing of items selected from the electronic item database based at least in part on the item query and the item availability via the particular delivery speed option, wherein items available via the particular delivery speed option are ranked higher in the listing of items than items not available via the particular delivery speed option; and
   send data encoding the listing of items to the client device for rendering on the display.

2. The non-transitory computer-readable medium of claim 1, wherein the user selection of the particular delivery speed option persists throughout a browsing session.

3. The non-transitory computer-readable medium of claim 1, wherein the program further includes instructions that cause the at least one computing device to at least:
   receive a user selection of a particular item from the listing of items;
   determine, after generating the listing of items, that the particular item has become no longer available for delivery to the current address via the particular delivery speed option;
   determine at least one alternative item that is similar to the particular item and is available for delivery to the current address via the particular delivery speed option;
   generate a user interface that includes an offer for the at least one alternative item that is similar to the particular item and is available for delivery to the current address via the particular delivery speed option; and
   send data encoding the user interface to the client device for rendering on the display.

4. A system, comprising:
   at least one computing device; and
   at least one application executable in the at least one computing device, wherein the at least one application includes instructions that cause the at least one computing device to at least:
      determine a location reported by a location system of a client device, the location system comprising at least one of: a global positioning system (GPS) device, a cellular radio triangulation system, or a WiFi access point reporting system;

determine a current address from a plurality of addresses associated with a user account based at least in part on the location reported by the location system;

dynamically generate a plurality of delivery speed options for the client device based at least in part on the current address;

send a listing of the plurality of delivery speed options to the client device for rendering on a display;

receive a user selection of a particular delivery speed option of the plurality of delivery speed options from the client device;

receive an item search criterion from the client device after receiving the user selection of the particular delivery speed option;

generate a listing of items selected from an electronic item database based at least in part on the item search criterion and item availability via the particular delivery speed option; and send data encoding the listing of items to the client device for rendering on the display.

5. The system of claim 4, wherein one of the plurality of delivery speed options is dynamically generated according to a maximum time for any of a plurality of delivery methods to deliver to the current address.

6. The system of claim 4, wherein the plurality of delivery speed options are dynamically generated based at least in part on a subscription status of the user account associated with the client device.

7. The system of claim 4, wherein the current address differs from a default delivery address of the user account associated with the client device.

8. The system of claim 4, wherein the plurality of delivery speed options are dynamically generated based at least in part on a comparison of a current time with a required order submission time associated with at least one possible delivery speed option.

9. The system of claim 4, wherein the user selection of the particular delivery speed option remains persistently associated with a current browsing session of the client device.

10. The system of claim 4, wherein the at least one application further includes instructions that cause the at least one computing device to at least:
send data encoding a recommendation of the current address to the client device for rendering on the display.

11. The system of claim 4, wherein the at least one application further includes instructions that cause the at least one computing device to at least:
determine that the particular delivery speed option is no longer available;
dynamically generate an updated plurality of delivery speed options for the client device; and
send a listing of the updated plurality of delivery speed options to the client device for rendering on the display.

12. The system of claim 4, wherein the at least one application further includes instructions that cause the at least one computing device to at least:
receive a subsequent user selection of a particular item from the listing of items;
determine, after generating the listing of items, that the particular item has become no longer available via the particular delivery speed option;
determine at least one item similar to the particular item and available via the particular delivery speed option;
generate a user interface configured to present an acknowledgement that the particular item is no longer available via the particular delivery speed option, the user interface further configured to present the at least one item similar to the particular item as an alternative to the particular item and available via the particular delivery speed option; and
send data encoding the user interface to the client device for rendering on the display.

13. The system of claim 4, wherein the at least one application further includes instructions that cause the at least one computing device to at least:
receive a subsequent user selection of a particular item from the listing of items;
determine, after generating the listing of items, that the particular item has become no longer available for delivery via the particular delivery speed option to the current address;
determine another address of the plurality of addresses associated with the user account through which the particular item is available via the particular delivery speed option;
generate a user interface configured to present an acknowledgement that the particular item is no longer available for delivery via the particular delivery speed option to the current address, the user interface further configured to present the other address as a selectable alternative; and
send data encoding the user interface to the client device for rendering on the display.

14. The system of claim 13, wherein the at least one application further includes instructions that cause the at least one computing device to at least:
determine a subsequent location reported by the location system of the client device; and
identify the other address from a plurality of other addresses based at least in part on the subsequent location reported by the location system.

15. A method, comprising:
determining, by at least one computing device, a location reported by a location system of a client device, the location system comprising at least one of: a global positioning system (GPS) device, a cellular radio triangulation system, or a WiFi access point reporting system;
determining, by the at least one computing device, a current address from a plurality of addresses associated with a user account based at least in part on the location reported by the location system;
dynamically generating, by the at least one computing device, a plurality of delivery speed options for the client device based at least in part on the current address;
sending, by the at least one computing device, a listing of the plurality of delivery speed options to the client device for rendering on a display;
receiving, by the at least one computing device, a user selection of a particular delivery speed option of the plurality of delivery speed options from the client device;
receiving, by the at least one computing device, an item search criterion from the client device after receiving the user selection of the particular delivery speed option;
generating, by the at least one computing device, a listing of items selected from an electronic item database based at least in part on the item search criterion and item availability via the particular delivery speed option; and sending, by the at least one computing device, data encoding the listing of items to the client device for rendering on the display.

16. The method of claim 15, wherein the plurality of delivery speed options are dynamically generated based at least in part on at least one of: a subscription status of the user account associated with the client device or a comparison of a current time with a required order submission time associated with at least one possible delivery speed option.

17. The method of claim 15, further comprising:
sending, by the at least one computing device, data encoding a recommendation of the current address to the client device for rendering on the display.

18. The method of claim 15, further comprising:
determining, by the at least one computing device, that the particular delivery speed option is no longer available;
dynamically generating, by the at least one computing device, an updated plurality of delivery speed options for the client device; and
sending, by the at least one computing device, a listing of the updated plurality of delivery speed options to the client device for rendering on the display.

19. The method of claim 15, further comprising:
receiving, by the at least one computing device, a subsequent user selection of a particular item from the listing of items;
determining, by the at least one computing device, after generating the listing of items, that the particular item has become no longer available via the particular delivery speed option;
determining, by the at least one computing device, at least one item similar to the particular item and available via the particular delivery speed option;
generating, by the at least one computing device, a user interface configured to present an acknowledgement that the particular item is no longer available via the particular delivery speed option, the user interface further configured to present the at least one item similar to the particular item as an alternative to the particular item and available via the particular delivery speed option; and
sending, by the at least one computing device, data encoding the user interface to the client device for rendering on the display.

20. The method of claim 15, further comprising:
receiving, by the at least one computing device, a subsequent user selection of a particular item from the listing of items;
determining, by the at least one computing device, after generating the list of items, that the particular item has become no longer available for delivery via the particular delivery speed option to the current address;
determining, by the at least one computing device, another address of the plurality of addresses associated with the user account through which the particular item is available via the particular delivery speed option;
generating, by the at least one computing device, a user interface configured to present an acknowledgement that the particular item is no longer available for delivery via the particular delivery speed option to the current address, the user interface further configured to present the other address as a selectable alternative; and
sending, by the at least one computing device, data encoding the user interface to the client device for rendering on the display.

\* \* \* \* \*